June 25, 1946.　　　　D. FIRTH　　　　2,402,743
MOUNTING FOR SHEAVES, ETC
Filed June 7, 1944　　　4 Sheets-Sheet 1
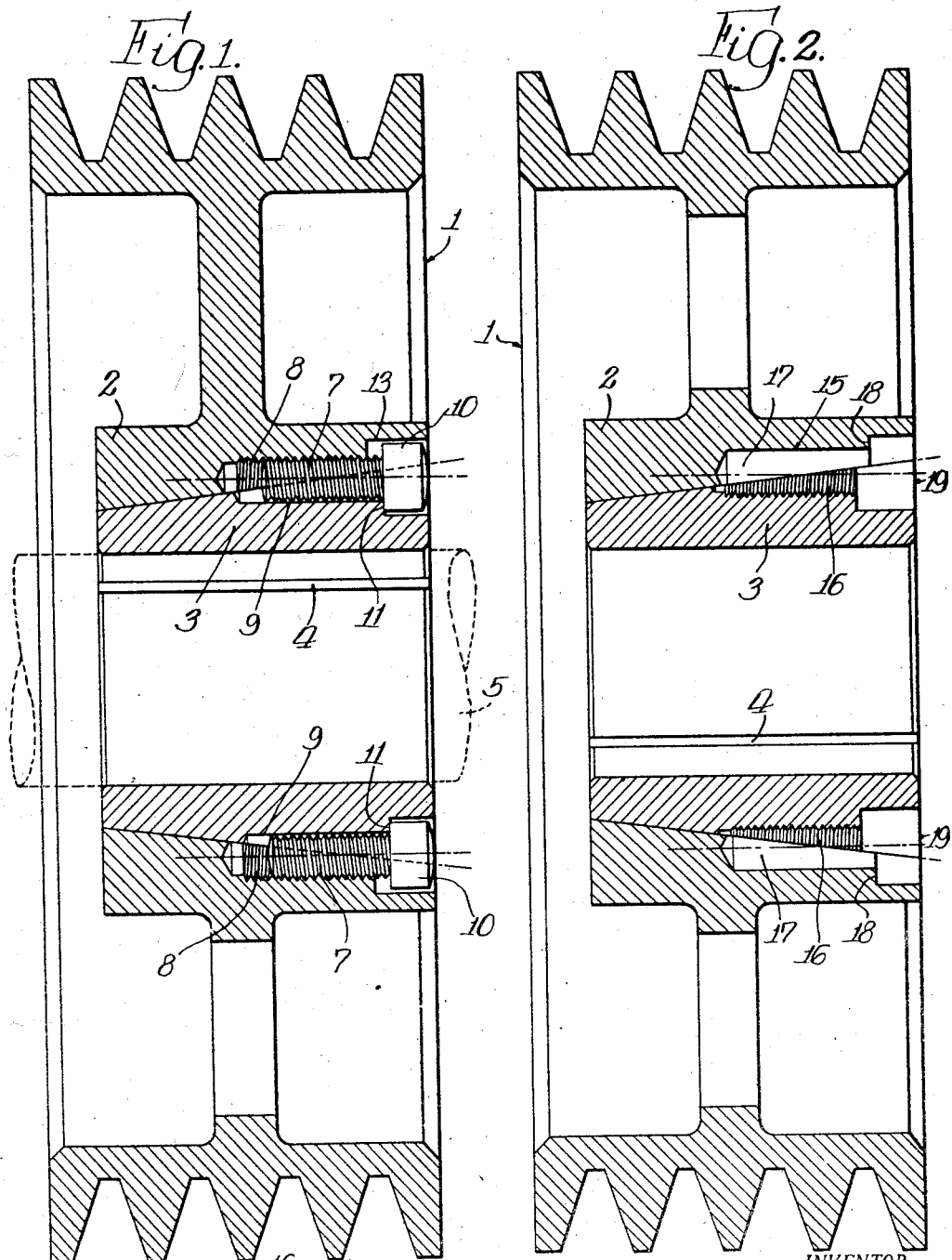
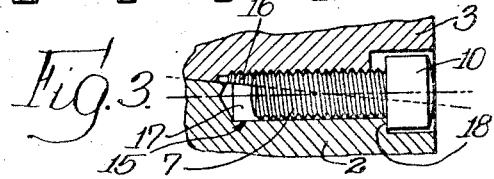
INVENTOR.
David Firth,
BY Osgood H. Dowell
Atty.

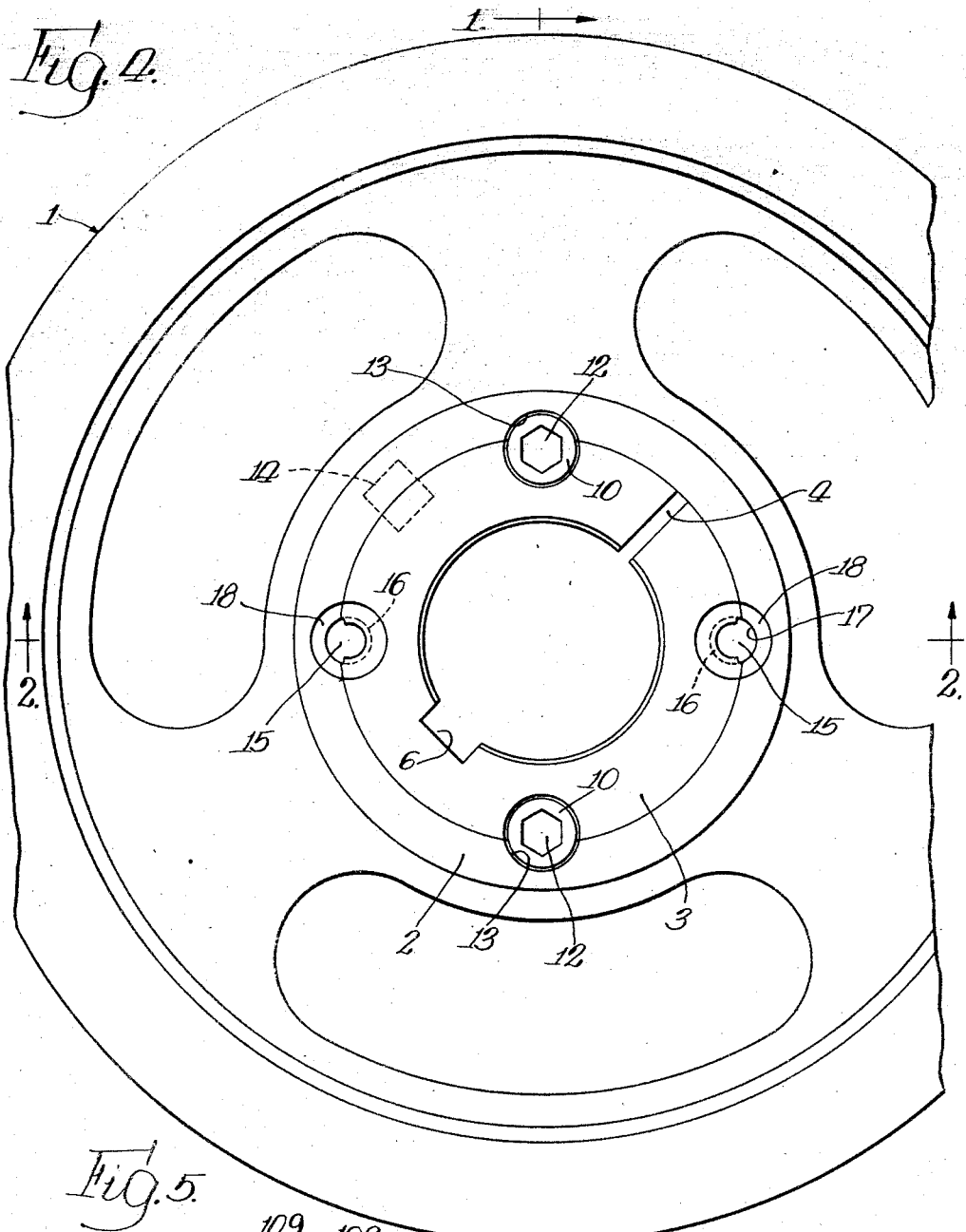

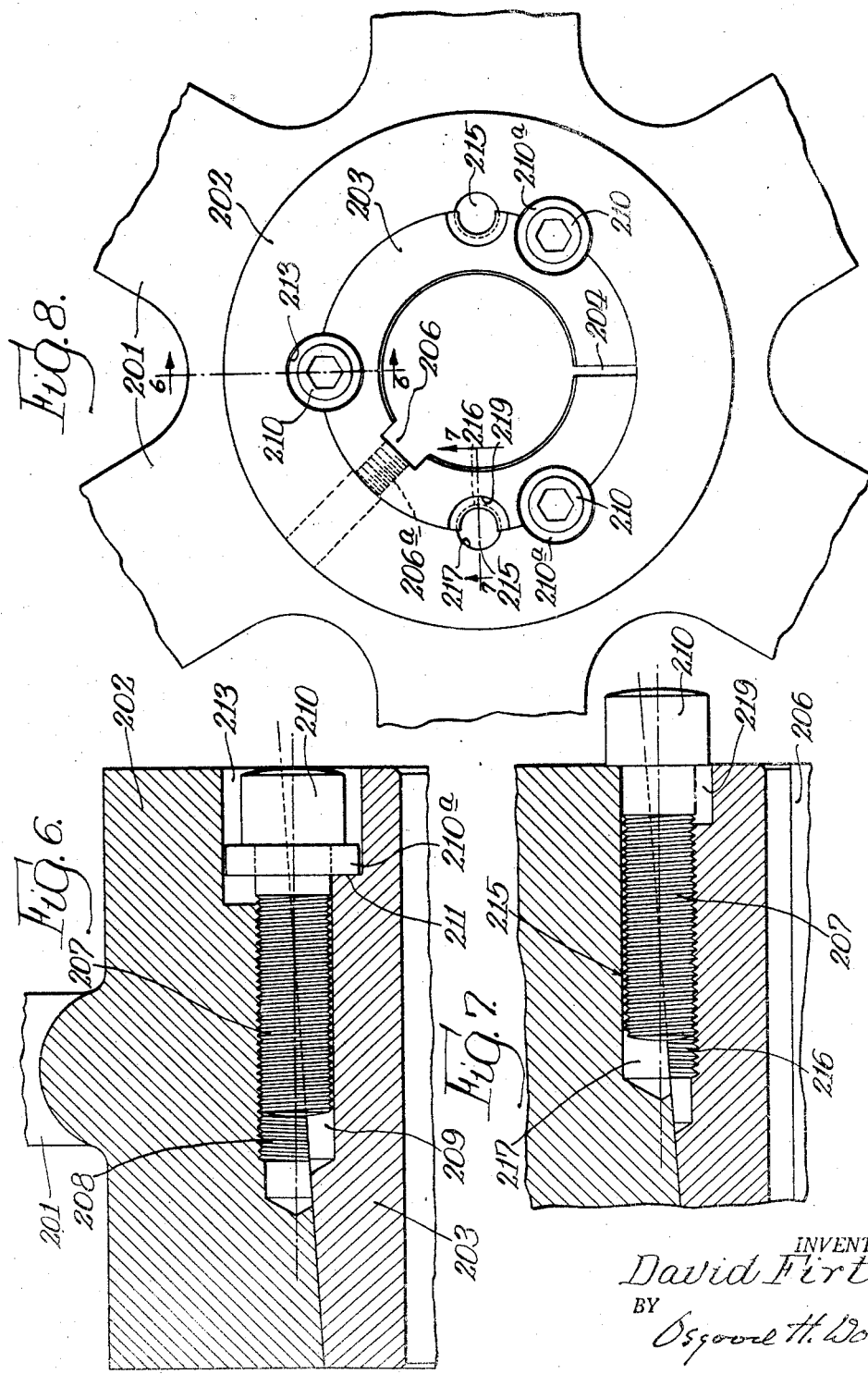

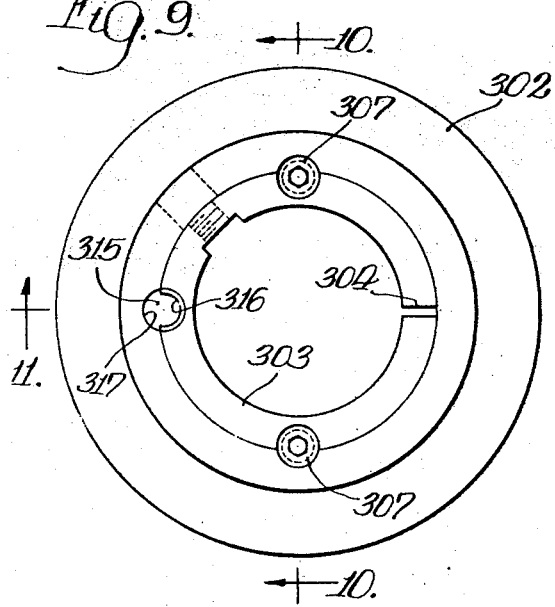
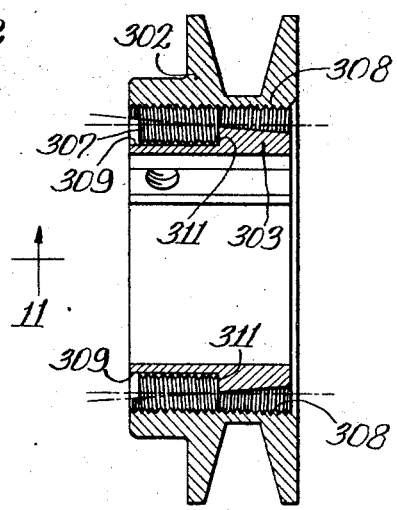
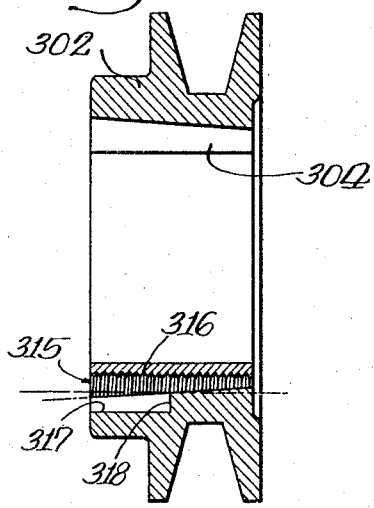
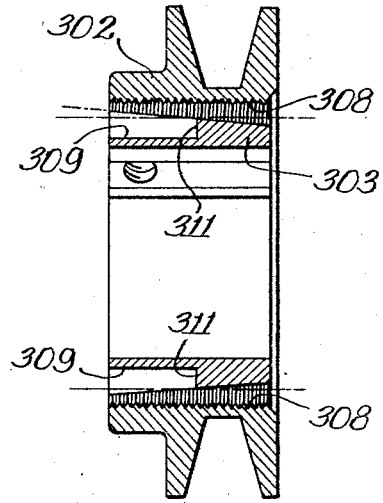

Patented June 25, 1946

2,402,743

UNITED STATES PATENT OFFICE 2,402,743

MOUNTING FOR SHEAVES, ETC.

David Firth, South Bend, Ind., assignor to Dodge Manufacturing Corporation, Mishawaka, Ind., a corporation of Indiana Application June 7, 1944, Serial No. 539,204

11 Claims. (Cl. 287—52)

My invention relates to the mounting on shafts of sheaves or pulleys and other machine elements, and specifically to mountings of the type utilizing a tapered longitudinally split contractible hub sleeve or bushing and a plurality of screws parallel with the hub axis for effecting wedging of such sleeve or bushing between the hub of the sheave or other element and the shaft to which it is applied.

An object of the invention is to provide an improved mounting of said type whereby to obtain, with the usual advantages thereof, substantial additional advantages; having in view more particularly the provision of a construction of such character as to minimize or materially to reduce dimensional requirements for accommodation of the screws and their connections with the hub and bushing, and to permit use of a flangeless bushing and to obviate necessity for any extension of either the hub or bushing and cumbersome attachment thereto or projection therefrom for connection with the screws; whereby to permit substantial reduction in the weight of and saving in the amount of metal required for such mountings, especially in units for application to shafts of large and medium sizes, and rendering the invention applicable to short hubs equipped with tapered contractible bushings longitudinally coextensive or approximately coextensive with the hub.

A further object of the invention is to provide an improved mounting of the type referred to having provision whereby said screws or others can be utilized to effect de-wedging of the bushing or release thereof from gripping engagement with the shaft and hub, the arrangement of the screws and their connections for both the wedging and de-wedging operations being such as to obtain the advantages aforesaid in a unit which can be not only easily installed on the shaft but also easily and quickly demounted.

Objects and advantages of the invention more or less auxiliary or subsidiary to those above indicated will be understood from the following description with reference to the accompanying drawings.

In said drawings, there is shown for illustration in Figs. 1 to 4 a shaft mountable unit or structure embodying the invention in one practicable form; while other structures embodying the invention are shown by additional figures.

Fig. 1 is a longitudinal section of said illustrative unit or structure first mentioned, the section being taken on the line 1—1 of Fig. 4 looking in the direction indicated by the arrows.

Fig. 2 is a longitudinal section thereof taken on the line 2—2 of Fig. 4, looking in the direction similarly indicated.

Fig. 3 is a detail view showing one of the screws arranged for the de-wedging operation in one of the holes therefor shown in Fig. 2.

Fig. 4 is an end elevation of said illustrative unit or structure, looking at the right hand end of Fig. 1.

Fig. 5 is a fragmentary view in longitudinal section of a portion of a structure generally similar to that of Figs. 1 to 4 but in which the arrangement of the screws and their connections is reverse to that in the structure of Figs. 1 to 4.

Fig. 6 is a fragmentary view in section taken on the line 6—6 of Fig. 8, showing a part of the hub and bushing and one of the connecting screws of another structure embodying the invention.

Fig. 7 is a detail view showing one of the screws of said last mentioned structure arranged for the de-wedging operation in one of the holes therefor in a section of said structure taken on the line 7—7 of Fig. 8.

Fig. 8 is an end elevation on a reduced scale of said structure of which parts are shown in Figs. 6 and 7.

Fig. 9 is an end elevation of another device embodying the invention.

Fig. 10 is a longitudinal section thereof on the line 10—10 of Fig. 9, looking in the direction of the arrows.

Fig. 11 is a longitudinal section taken on the line 11—11 of Fig. 9, looking in the direction of the arrows.

Fig. 12 is a section similar to that of Fig. 10 omitting the screws.

Referring first to Figs. 1 to 4, a machine element to be mounted on a shaft is represented therein by a sheave 1 shown as of a conventional form for use in a multiple V-belt drive. The hub 2 of the sheave has a tapered bore in which is fitted a tapered longitudinally split contractible bushing 3, the split thereof being indicated at 4. The bushing is bored to fit the shaft to which the sheave is to be applied, such shaft being indicated by dotted lines and designated by the numeral 5 in Fig. 1. A keyway in the bushing for engagement by a conventional shaft-key is indicated at 6.

The hub and bushing are connected by screws 7 by the tightening of which the bushing is forcible axially relative to the hub in a direction to wedge it between the hub and shaft. These screws, parallel with the shaft, are partly in the hub and partly in the bushing, in threaded engagement with one of them and operatively connecting the other thereto. As shown the screws are arranged for insertion and operation from the end of the hub containing the larger end of the bushing, the screws being in threaded engagement with the hub; gaining the advantages of, first, utilizing screw engagement of the screws with the incontractible hub for said forcing or wedging operation, and, second, utilizing the thicker part of the bushing for partial accommodation of said screws. The holes for said screws, formed partly in the hub and partly in the bushing, are tapped or screw-threaded only in the hub. In the illustrative structure, said screw holes are provided by mutilated female screw portions 8 of the hub and complemental unthreaded longitudinal grooves 9 in the bushing. The screws are therefore in engagement with mutilated hub threads or thread segments of gradually increasing arcuate extents, while fitting in bushing grooves of gradually decreasing particircular cross section.

By arranging the screws in radial positions such that their longitudinal centers intersect an imaginary or geometric conical surface coincident with the tapered hub bore at points spaced inwardly from the outer ends of the screw-holes (such points being preferably so located that said geometric conical surface also intersects the outer ends of said screw holes), the screws occupy so little radial space in the thinner end of the hub wall as to permit the use, as is desirable, of screws of fairly large diameter in proportion to the radial thickness of the hub wall at its thinner end; while, on the other hand, as the larger end of the bushing is utilized for partial accommodation of the screws, the essential radial thickness of the bushing wall at its thinner end is substantially unaffected by the presence of the screws. Practically speaking, the screws of the illustrative structure require no greater radial dimensions of the hub and bushing than they would ordinarily have anyhow.

And by employing screws of sufficient length to extend inwardly substantial distances from said points of intersection of their longitudinal centers with said geometrical conical surface, the advantage is gained that the screws when in position to be tightened are in engagement for substantial portions of their lengths with mutilated hub threads or thread segments of more than semicircular extent. Hence during the tightening of the screws, and thereafter until they are withdrawn or retracted a substantial distance, the screws are firmly held by and in threaded engagement with the hub, notwithstanding contraction of the bushing as it is wedged between the shaft and hub; thus promoting effectual holding action of the screws and obviating chance of any accidental release of the screws from their holding action.

In the illustrative structure, utilizing countersunk headed screws of moderate lengths, the points at which their longitudinal centers intersect said geometric conical surface are nearly about midway of the lengths of the screws when in position to be tightened, such points being somewhat nearer the inner than the outer ends of the screws, and the screws and holes therefor are intersected longitudinally by said geometric surface. Hence the screws for their full lengths including their heads are between the hub and bushing, about or nearly half and half in each; and also their threaded shanks for the entire lengths thereof are partially in contact with the hub or female screw portions 8 thereof and partially in contact with the bushing in the complemental grooves 9 thereof, approximately or nearly half and half in each. This gives an exceedingly advantageous construction, applicable to a short hub equipped with a tapered contractible bushing longitudinally coextensive therewith, as well as to longer hubs containing short or shorter bushings.

However the screws may extend inwardly from the points of intersection of their longitudinal centers with said geometrical surface substantially greater relative distances than in the illustrative structure without altering the fundamental principle involved. Thus in the case of a long hub equipped with a long bushing substantially or nearly coextensive with the hub it may be desirable to extend the screw-holes inwardly to provide in the hub complete or nearly complete thread convolutions in continuation of the mutilated female threads at 8, and to employ longer screws with their inner ends in screw engagement with such complete or nearly complete thread convolutions in the hub.

For coaction with the bushing, the screws or heads 10 thereof may bear against appropriately located shoulders on the bushing. In the illustrative structure the bushing is formed with such shoulders at 11 for engagement by the screw heads 10, said shoulders being positioned outwardly beyond any part or parts of the hub in line with the screw heads. It will be understood that the screws when tightened do not reach to the inner ends of the screw holes or threaded portions 8 thereof in the hub. Hence when the screws have been screwed up sufficiently for their heads to abut against said bushing shoulders, further screwing of the screws into the hub will draw or force the bushing therewith, or force the hub and bushing to axial relationship to wedge the bushing between the hub and a shaft fitting the bore of the bushing.

It is desirable to have the screws not only within the hub but also entirely within it, or in other words to avoid projections of the screws or heads thereof beyond an end of the hub; for which purpose the illustrative structure utilizes Allen-type cap screws having cylindrical heads 10 provided with angular wrench sockets 12, said cylindrical heads being countersunk in circular recesses 13 formed partly in the hub and partly in the bushing and of greater depth in the hub than is the bushing, thereby providing more than semicircular bushing shoulders 11 arranged outwardly from the base parts of said recesses in the hub.

By employing cap screws and forming the bushing with the semicircular or more than semicircular shoulders 11 or other suitable bearing parts for abutment by the screw heads, substantially greater bearing areas for transmission of force by the screws to the bushing are obtained than would be obtainable by bearing of the screws at their inner ends against the bushing, though suitable and appropriately located bushing shoulders for engagement by the inner ends of the screws could be provided by shortening the bushing grooves 9. While therefore the illustrative structure could be modified within the scope of the invention by substituting for the countersunk cap screws 7 headless screws bearing at their inner ends against such appropriately located bushing shoulders, and such modification would be not impracticable, at least under some conditions, yet the illustrative structure is substantially more practicable and efficient. A further advantage of the illustrative construction is that it may be embodied if desired in a form in which the screw-holes are extended or continued inwardly, as hereinbefore suggested, to provide in the hub complete or nearly complete thread convolutions for engagement by the inner end portions of relatively longer screws.

It will be observed that the radial spacing of the screws from the shaft obtained in the illustrative structure allows ample room for the counter-sinking of cap screw heads of large diameter; furthermore if it were desired for cheapness to sacrifice the advantage of countersunk Allen-type cap screws by substituting therefor ordinary large headed cap screws, this would be allowable by forming the bushing without counterboring for the recesses 13 with semicircular lugs or projections for abutment by the heads of such ordinary cap screws; or such ordinary cap screws somewhat longer than the screws shown could bear at their inner ends against bushing shoulders provided as hereinbefore mentioned.

The number of screws required will depend upon the magnitude and proportions of the structure in which the invention is embodied. In a structure of the design and proportions shown in Figs. 1 to 4, for application to a shaft of say about 1⅞" diameter, two screws of the relative sizes shown arranged at diametrically opposite sides of the shaft are considered appropriate; though three or more suitably angularly spaced screws of either the same or smaller size may be used. For larger hub constructions, three or more correspondingly larger screws will ordinarily be desirable.

When the screws have been screwed up just sufficiently to draw the bushing in its normal uncontracted state into close contact with the hub, the relative axial movement of the hub and bushing required for wedging the bushing tightly between the hub and shaft will depend of course upon the clearance to be taken up between the interfitted parts and otherwise upon the angle of taper of the bushing and hub bore. By a taper at an angle as great as may be practicable for effective wedging action, the required relative movement for tight wedging may be minimized, so that, for example, if the bushing originally protrudes at its larger end slightly beyond the corresponding end of the hub it will be drawn about flush therewith by tightening the screws as required for tight wedging. In Fig. 1, the angle of taper, i. e. the included angle between diametrically opposite longitudinal contour lines of the bushing is shown as thirteen degrees, which is not too great for effective wedging action, though an angle of about or not in excess of eleven degrees would be preferable, and in many cases a much less angle, say of about seven or eight degrees may be desirable. A taper such as to give an included angle of from eight to eleven degrees is advantageous to permit effective wedging without rendering it unduly difficult to remove the bushing from the hub after it has been wedged.

Assuming an appropriate taper of the bushing and hub bore for effective wedging action, and a close fit of the bushing in uncontracted state on the shaft, then by tightly screwing up the screws the bushing can be wedged very tightly between the shaft and hub, effectually securing the sheave to the shaft by a press fit of the interfitted parts, without impairment of their concentricity or tendency to cant the sheave from truly erect position on the shaft. The connection thus obtained may be depended upon for a driving connection under many conditions, though it is ordinarily desirable and in accordance with preferred practice to key the bushing to the shaft by conventional keying means as indicated at 6 in Fig. 4. Under ordinary running load conditions, or at least under many conditions of service, there would be no need for keying the bushing to the hub; furthermore in the illustrative structure the screws function as keys, which together with the friction between the tapered surfaces of the bushing and sheave hub afford a powerful driving connection. In a unit to be subjected to severe shock loads or reversing loads, conventional keying means may be used between the hub and bushing as indicated in dotted lines at 14 in Fig. 4; such conventional keying means permitting relative axial or longitudinal movement of the sheave hub and bushing but preventing relative rotation thereof.

To permit easy demounting, the illustrative structure is provided with additional screw-holes 15 in which the screws 7, or other screws if preferred, can be used as jacking screws for forcing the hub and bushing to axial relationship to release the bushing from gripping engagement with the shaft and hub. These additional screw-holes 15 are generally similar to and arranged similarly to those first described, except for necessary changes to reverse the effect or action obtained upon screwing up screws therein. That is to say, screws operated in the screw-holes 15 are in threaded engagement only with the bushing and coact with the hub for relatively moving the hub and bushing axially in the opposite direction to that in which they were forced to wedging the bushing. Said screw-holes 15 therefore comprise mutilated female screw portions 16 of the bushing and complemental unthreaded grooves 17 in the hub, and, instead of having accessory shoulders on the bushing for the screws or heads thereof to bear against, they have such shoulders on the hub, as indicated for example at 18.

Although these additional screw-holes 15 could be designed for use therein of somewhat specifically different screws, they are in this instance designed for use therein of the screws 7, and with their accessory features are shown as substantially like the first described screw-holes and their accessory features, except for the changes aforesaid to reverse the operative connections of the screws when used in the screw-holes 15 from those when the screws are used in the first described screw-holes. Therefore the statements hereinbefore made with reference to the construction and arrangement of the screws 7 and their connections and the advantages thereof when arranged in the first described screw-holes shown in Fig. 1, are applicable mutatis mutandis to the screws and their connections when the screws are arranged in the additional screw-holes 15 shown in Figs. 2, 3 and 4.

In this connection, the screw-holes 15, like those first described, are shown counterbored or enlarged to receive the screw-heads 18 in recesses 19 formed partly in the hub and partly in the bushing, such recesses in this instance being deeper in the bushing than in the hub to provide the segmental hub shoulders 18 for engagement by the screw-heads, said shoulders being offset outwardly from the base portions of said recesses in the bushing. As will be obvious, however, the hub instead of being counterbored to provide parts of the recesses 19 therein could be formed without such parts of said recesses therein, or in other words the structure could be modified with respect to the screw-holes 15 by counterboring only the bushing to admit the screw-heads 10; in which case the heads of the screws when operated in the screw-holes 15 would bear against the unrecessed end of the hub and upon tightening of the screws would enter recesses therefor in the bushing.

The screw-holes 15, as well as those first described, are formed for the screws to fit properly therein when the bushing fitting closely in the hub is in its normal uncontracted state. While the screws are being screwed into the holes 15 and until they are somewhat tightened, the bushing, having been previously wedged between the hub and shaft, is in its contracted state. By reason of the location, at substantial distances inwardly from the counterbored recesses for the screw heads, of the points of intersection of the longitudinal centers of the screws with the geometric conical surface in which the tapered hub bore lies, the screws 7 when in position to be tightened in the holes 15 are for substantial portions of their lengths in threaded engagement with mutilated bushing threads or thread segments of greater than semicircular extent, thus giving an effectual hold for the screws as they are tightened and while the bushing expands to its uncontracted state.

As will be apparent, the assembled unit comprising the sheave with the hub mounting means therefor hereinbefore described can be easily installed on a shaft by slipping it thereon and tightening the screws 7, and, upon withdrawal or sufficient retraction of said screws, can be easily demounted by operating such screws or other suitable screws in the additional screw-holes 15 to effect de-wedging of the bushing, and then slipping the released unit off from the shaft.

Thus the invention provides a highly practicable and efficient structure, having the usual advantages inherent in an adapter type mounting, plus easy demountability, and accomplishing the objects hereinbefore stated. Further the invention affords many incidental advantages, including avoidance of the unbalancing effect that would be incident to the use of a split flanged bushing; avoidance of any cumbersome projection or attachment on an extension of either the bushing or the hub that would occupy valuable room likely to be needed for close juxtaposition of a sheave to a motor frame or mounting of a sheave hub closely adjacent to a bearing; and permissible utilization of countersunk cap screws or of other screws without projections thereof from the hub.

In manufacturing units embodying the invention, the screw-holes with their accessory features may be provided by (1) drilling, tapping and counterboring, in the hub before boring it, threaded holes to provide the hub portions of the screw-holes first hereinbefore described in which the screws are to be operated for the bushing-wedging operation, and drilling and counterboring therein other unthreaded holes to provide the hub portions of the additional screw holes 15; and (2) drilling, tapping and counterboring, in a bushing member of originally oversized diameter from which the bushing is to be formed, threaded holes to provide the bushing portions of said first described screw-holes, and drilling and counterboring therein other unthreaded holes to provide the bushing portions of the additional screw-holes 15; and (3) boring the hub to the required taper and machining the bushing member to the required taper.

The principle of the invention may be availed of, and its major advantages obtained, in a structure of the general character hereinbefore described but having the screws and their connections arranged in reverse manner to those in the illustrative structure of Figs. 1 to 4, or in other words having the screws arranged for insertion and operation from the opposite end of the hub to that in which they are insertable in said illustrative structure and accommodated partially in the larger end of the hub and partially in the smaller end of the bushing. With the screws and their connections so reversely arranged, there would be lost the advantages incident to utilization of the larger end of the bushing for partial accommodation of the screws, and the advantage of screw engagement of the screws with the incontractible hub for the operation of wedging the bushing between the hub and shaft; nevertheless a construction having the screws and their connections so reversely arranged would be practicable and obtain the principal advantages of the invention and many of its subsidiary advantages.

A structure generally similar to that hereinbefore described but having the screws and their connections arranged as above suggested reversely to those of the illustrative structure of Figs. 1 to 4, is partially shown by a fragmentary view in Fig. 5 wherein the tapered contractible bushing 103 and sheave hub 102 in which it fits are connected by screws 107. These screws when in the holes in which they are operated to effect wedging of the bushing between the shaft and hub are in threaded engagement with the bushing and coactive with the hub; said holes comprising mutilated female screw portions 108 of the bushing and complemental unthreaded grooves 109 in the hub, and the screw heads 110 being countersunk and bearing against hub shoulders 111 provided by forming the recesses for the screw heads deeper in the bushing than in the hub. It will be observed that by virtue of the location of the points of intersection of the longitudinal centers of the screws 107 with the geometric conical surface in which the tapered hub bore lies, the screws for substantial portions of the lengths thereof engage bushing thread segments which are more than semicircular, insuring effectual holding of the screws in threaded engagement with the bushing as it contracts in being wedged between the shaft and hub. In the structure partially represented in Fig. 5, the additional screw holes (not shown) in which the screws are operated for effecting de-wedging of the bushing are with their accessory features arranged for reverse effect or action of the screws when operated therein, or in other words for threaded engagement of the screws with the hub and abutment of the screw heads against bushing shoulders, as will be readily understood from the previous description of the structure of Figs. 1 to 4.

With the screws arranged as in the illustrative structure of Figs. 1 to 4, the bushing may be thin-walled at its smaller end or of considerably larger bore or inside diameter than the bushing shown in said figures; while the radial thickness of the hub wall at its thinner end portion, or in the transverse plane of the inner faces of the screw heads 10, need not be much if any greater, or even as great as, the diameter of the threaded shanks of the screws. With the screws arranged as in Fig. 5, the essential radial thickness of the hub is substantially unaffected by their presence, while the radial thickness of the bushing wall in its thinner end portion or in a corresponding transverse plane, though it would need to be about or nearly as great as the diameter of the screws, may nevertheless be materially less than if the screw holes were only in the bushing.

The opportunity for saving metal and weight in sheave or pulley hub mountings of the class under consideration which is offered by the present invention, whether in a form of embodiment such as is exemplified in Figs. 1 to 4 or a form of embodiment such as is exemplified in the structure partially illustrated in Fig. 5, will therefore be readily apparent. For, in comparison with a hub mounting structure for a sheave or pulley of corresponding size and for application to a shaft of corresponding diameter, in which either one of the hub and bushing has a extension beyond an end of the other provided with a flange or carrying an attachment connected to said other by screws or bolts in holes in said other, a structure embodying the present invention permits a materially thinner hub wall or materially thinner bushing wall, as the case may be; and the consequent possible saving in metal and weight by reduction of essential radial dimensions of the hub or bushing, as the case may be, plus the saving of metal and weight by avoidance of a material extension of the hub or bushing one beyond the other and provision of a flange or attachment on such extension, is or may be very considerable indeed.

Practically speaking, the present invention permits minimizing the essential longitudinal and radial dimensions of the hub and bushing for accommodation of the screws, while also permitting the use of substantially shorter screws than would otherwise be required in a structure of the class to which the invention relates. The difference in weight between a structure embodying said invention and another of said class for a comparable size of sheave to be mounted on a shaft of comparable size, may be from twenty-five to one hundred pounds or more in hub mounting constructions for large sheave and shaft sizes.

Figs. 6 to 8 of the drawings represent one form of hub mounting embodying the invention for a large power-transmission pulley the rim of which (not shown) is connected by spokes 201 to the hub 202. The pulley hub has a tapered bore, shown in this instance as of relatively slight slant, in which is fitted a correspondingly tapered longitudinally split contractible bushing 203, the split thereof being indicated at 204. A keyway in the hub for engagement by a conventional shaft key is indicated at 205, and a radially disposed setscrew in the hub for bearing against such key is indicated at 206ª. The hub and bushing are connected by large Allen-type cap screws 207 arranged and connected substantially as in the structure first hereinbefore described, being in threaded engagement with mutilated threads of mutilated female screw portions 208 of the hub and fitting in unthreaded bushing grooves 209 complementing said female screw portions to provide the screw holes for said screws, and the screw heads 210 being countersunk in recesses 213 formed partly in the hub and partly in the bushing but deeper in the hub to provide the outwardly offset bushing shoulders 211 against which the screw heads bear. In this instance, space therefor being available, the recesses 213 are oversized to accommodate thick thrust-transmitting washers 210ª of greater diameter than the countersunk screw heads 210 which thus bear indirectly against said bushing shoulders 211 through said washers 210ª. This feature of construction is optional for use where space therefor is available, being of advantage for decreasing the compressive stress in the metal of the bushing under the heads of the cap screws. Three suitably angularly spaced cap screws 207 appearing in Fig. 6 are employed in this instance, while two diametrically opposite additional screw holes 215 are provided for use therein of said screws 207 for the operation of de-wedging the bushing, said additional screw-holes 207 comprising mutilated female screw portions 216 of the bushing and complemental unthreaded longitudinal grooves 217 in the hub. In this instance, the additional screw-holes 215, instead of being counterbored in both the hub and bushing to provide recesses corresponding to 213, are counterbored only in the hub to provide recesses 219. Thus when the screws 207 are arranged for operation in the screw-holes 215, the heads 210 of the screws abut against the outer end of the bushing, and upon tightening of the screws they move with the bushing inwardly, their heads 210 passing into the recesses 219 of the hub. It will be observed from Figs. 7 and 8 that notwithstanding the relatively slight taper of the bushing, the points of intersection of the longitudinal centers of the screws with the geometric conical surface in which the hub bore lies are such that the screws when arranged for the wedging operation engage for substantial portions of their lengths mutilated hub threads which are more than semicircular (Fig. 7), and that the screws when arranged for the de-wedging operation engage for substantial portions of the lengths thereof mutilated bushing threads which are more than semicircular (Fig. 8).

Figs. 9 to 12 show one practicable application of the invention to a small unit. Fitting the tapered hub bore of a small sheave body 302 is an enclosed flangeless tapered split contractible bushing 303, the split thereof being indicated at 304. Holes for connecting screws 307 are provided by mutilated female screws 308 in the sheave body and complemental unthreaded grooves 309 in the bushing, the proportions being such as to provide at the inner ends of said grooves bushing shoulders 311 of substantial radial thickness for engagement by said screws 307. The screws 307 are shown as headless and wholly enclosed. By tightening said screws, in threaded engagement with only the sheave body and bearing at their inner ends against said bushing shoulders 311, the bushing is forced axially relative to the sheave body in a direction to wedge the bushing between said sheave body and a shaft. In this instance one additional screw hole 315 is provided by a mutilated female screw 316 in the bushing and a complemental unthreaded groove 317 in the sheave body, there being at the inner end of said groove a shoulder 318 on said sheave body. After withdrawal of the screws 307 from the first mentioned screw holes, one of them can be operated in the additional screw hole 315, in threaded engagement with the bushing and bearing against said shoulder 318 on said sheave body, for de-wedging the bushing. In the small unit shown, the one additional screw hole 15 is sufficient for the de-wedging or loosening of the bushing from gripping engagement with the shaft and sheave body, though of course two such additional screw-holes arranged at opposite sides of the shaft bore may be provided.

Obviously the structures described may be variously modified as to details to suit different requirements and conditions, and it is not indispensable to use all the features of the invention conjointly since different features thereof may be advantageously used in various different combinations and sub-combinations.

The term "hub" as used in the following claims may denote the hub of a machine element or device to be mounted on a shaft or such element as a whole having a tapered hub bore.

I claim:

1. A shaft-mountable unit comprising, in combination, a hub having a tapered bore, a tapered split contractible bushing fitting therein and having a shaft bore of uniform diameter, said hub and bushing being formed with confronting complemental parts of screw holes arranged substantially parallel with said shaft bore and having screw-threaded walls in one of the hub and bushing and threadless walls in the other, said one being that in which the hole walls are of progressively increasing arcuate extent, screws in said holes in threaded engagement with said one, and shoulders on said other against which said screws can be tightened for wedging the bushing between the hub and a shaft.

2. A shaft-mountable unit comprising, in combination, a hub having a tapered bore, a tapered split contractible bushing fitting therein and bored to fit a shaft of uniform diameter, said hub and bushing being formed with confronting complemental parts of longitudinal open-ended screw holes having screw-threaded walls in one of the hub and bushing and threadless walls in the other, the threads of said threaded walls progressing toward the thicker end of said one, retractible screws in said holes in threaded engagement with said one, and shoulders on said other against which said screws can be tightened for wedging the bushing between the hub and a shaft, the screws being insertible and removable while the bushing is fitted in the hub.

3. A shaft-mountable unit comprising, in combination, a hub having a tapered bore, a tapered split contractible bushing fitting therein and bored to fit a shaft of uniform diameter, said hub and bushing being formed with confronting complemental parts of longitudinal screw holes having outer open ends in the larger end of the bushing and adjacent end of the hub and having screw-threaded walls in the hub and threadless walls in the bushing, and cap screws screwed into said holes and whose heads abut the bushing, the latter being flangeless and the hub being recessed to permit recession of said heads thereinto.

4. A shaft-mountable unit comprising, in combination, a hub having a tapered bore, a tapered split contractible bushing fitting therein and bored to fit a shaft of uniform diameter, said hub and bushing being formed with confronting complemental parts of longitudinal screw holes having outer open ends in the larger end of the bushing and adjacent end of the hub and having screw-threaded walls in the hub and threadless walls in the bushing, the threadless parts of said holes being shorter than the threaded parts and having inner end walls providing thrust shoulders, and screws having blunt inner ends screwed into said holes against said shoulders.

5. A shaft-mountable unit comprising, in combination, a hub having a tapered bore, a tapered split contractible bushing fitting therein and bored to fit a shaft of uniform diameter, said interfitted hub and bushing having formed therein partly in each longitudinal screw-holes having counterbored outer portions providing circular recesses for reception of cap screw heads partly in the hub and partly in the bushing, the screw-holes being tapped or threaded only in one of said hub and bushing and said recesses being deeper in said one than in the other whereby relatively outwardly offset thrust shoulders are provided on said other, and cap screws in said holes having threaded shanks in threaded engagement with said one and cylindrical heads provided with wrench sockets countersunk in said recesses and bearing against said shoulders.

6. A shaft-mountable unit comprising, in combination, a hub having a tapered bore, a tapered split contractible bushing fitting therein and bored to fit a shaft of uniform diameter, screws usable alternatively for relatively moving the hub and bushing to wedge the bushing between the hub and a shaft and for reversely relatively moving them to de-wedge it, means comprising mutilated female screws in said hub and abutments on the bushing for operatively connecting said screws with the hub and bushing for one of said operations, and means comprising mutilated female screws in the bushing and abutments on the hub for operatively connecting said screws with the hub and bushing for the other of said operations, said mutilated female screws of the hub and bushing being respectively cut at the tapered surfaces of the hub and bushing, and said hub and bushing each having unthreaded longitudinal grooves complementing the mutilated female screws of the other to provide holes for said screws.

7. A shaft-mountable unit comprising, in combination, a hub having a tapered bore, a tapered split contractible bushing fitting therein and bored to fit a shaft of uniform diameter, primary and secondary screw-holes parallel with the hub axis formed partly in the hub and partly in the bushing, the walls of the respective parts of said holes adjoining at the tapered surfaces of the hub and bushing, and screws operable in said primary holes for forcing the hub and bushing to axial relationship to wedge the bushing between the hub and a shaft and operable in said secondary holes for forcing them to axial relationship to de-wedge the bushing, said primary holes being threaded only in that one of the hub and bushing toward whose larger end the screws advance in said primary holes, and said secondary holes being threaded only in that one of said hub and bushing toward whose smaller end the screws advance in said secondary holes, there being provision whereby the screws when in either the primary or secondary holes are coactive with the other of said hub and bushing than the one with which they are in threaded engagement.

8. A shaft-mountable unit comprising, in combination, a hub having a tapered bore, a tapered split contractible bushing fitting therein and bored to fit a shaft of uniform diameter, primary and secondary screw-holes parallel with the hub axis formed partly in the hub and partly in the bushing, the walls of the respective parts of said holes adjoining at the tapered surfaces of the hub and bushing, and screws operable in said primary holes for forcing the hub and bushing to axial relationship to wedge the bushing between the hub and a shaft, said primary holes being threaded only in that one of the hub and bushing toward whose larger end the screws advance in said primary holes and the other of the hub and bushing having abutments for coaction of said screws therewith, said secondary holes being threaded only in said other and said one having abutments for coaction therewith of appropriate screws operated in said secondary holes, whereby, after withdrawal or sufficient retraction of said screws in said primary holes, appropriate screws can be operated in said secondary holes to force the hub and bushing to axial relationship to de-wedge the bushing.

9. A shaft-mountable unit comprising a hub having a tapered bore, a tapered split contractible bushing fitting therein and bored to fit a shaft of uniform diameter, said hub and bushing being formed with confronting complemental parts of longitudinally arranged screw-holes including primary holes and a secondary hole, all having open ends at the same end of the hub, said primary holes having screw-threaded walls in one of the hub and bushing and threadless walls in the other and said secondary hole having a threadless wall in said one and a screw-threaded wall in said other, the threads of said primary holes progressing toward the thicker end of said one and the threads of said secondary hole progressing toward the thinner end of said other, thrust shoulders on said other in association with said primary holes and a thrust shoulder on said one in association with said secondary hole, whereby appropriate screws can be screwed into said primary holes and tightened against said other for wedging the bushing between the hub and a shaft and can be retracted while the bushing is so wedged and an appropriate screw can be screwed into said secondary hole and tightened against said one for dewedging the bushing.

10. An element for a unit of the class described comprising a split contractible tapered bushing bored to fit a shaft of uniform diameter and formed with exterior longitudinal open-ended grooves parti-circular in cross-section, certain of said grooves having screw-threaded walls and certain of said grooves having threadless walls.

11. A hub section for a unit of the class described comprising a hub having a tapered bore and interior longitudinal open-ended grooves of parti-circular cross-section, certain of said grooves having screw-threaded walls and certain of said grooves having threadless walls.

DAVID FIRTH.